United States Patent [19]

Ferry

[11] Patent Number: 5,078,310
[45] Date of Patent: Jan. 7, 1992

[54] MECHANICALLY RETAINED FISH STRINGER ASSEMBLY

[76] Inventor: DeLois M. Ferry, 5090 Suburban Dr., Shorewood, Minn. 55331

[21] Appl. No.: 637,547

[22] Filed: Jan. 28, 1991

[51] Int. Cl.$^5$ .................... A44B 1/04; A01K 29/00
[52] U.S. Cl. .................... 224/103; 24/115 G
[58] Field of Search .................... 224/103; 24/115 G; 269/69, 157; 439/817, 818; 403/299, 343, 287

[56] References Cited

U.S. PATENT DOCUMENTS

| 781,091 | 1/1905 | Phillips | 439/817 |
| 2,950,888 | 8/1960 | Cottrill et al. | 224/103 |
| 3,540,637 | 11/1970 | Ezell | 224/103 |
| 3,806,860 | 4/1974 | Flammini | 439/817 |
| 4,328,605 | 5/1982 | Hutchison et al. | 24/115 G |
| 4,453,292 | 6/1984 | Bakker | 24/115 G |
| 4,811,466 | 3/1989 | Zubli | 24/115 G |
| 4,976,382 | 12/1990 | Carpenter | 224/103 |

FOREIGN PATENT DOCUMENTS 223093  10/1924  United Kingdom ............... 439/817

*Primary Examiner*—Henry J. Recla
*Assistant Examiner*—Keith Kupferschmid

[57] ABSTRACT

A mechanical retaining device, for a stringer assembly, having various base configurations which adapt to a number of angling situations. The retaining device includes a housing (12) containing a plunger (10) and a spring (38). A stringer rod relief (22) in a stringer rod (20), engaged by plunger (10), secures the stringer assembly in the retaining device.

11 Claims, 7 Drawing Sheets

MECHANICALLY RETAINED FISH STRINGER ASSEMBLY

BACKGROUND OF THE INVENTION

1. Field of the Invention

This invention relates in general to fishing implements, and in particular to an implement for the retaining and handling of fish.

2. Prior Art

Typically, an angler who procures a fish chooses to keep it In the past, securing or retaining a fish was limited to the use of a line, basket, or clip assembly. Inherently, these implements suffer from a number of disadvantages:

(a) Said implements do not provide a convenient or effective means by which they are readily secured to a location.

(b) Said implements are not designed to encompass a variety of sport fishing situations, e.g., river or shore angling (c) Said implements do not provide ready access once affixed to a location.

No device is known that provides a reliable means to secure at least a stringer assembly.

SUMMARY OF THE INVENTION

Accordingly, several objects and advantages of the present invention are:

(a) to provide a convenient and effective means of securing at least a stringer assembly to a location for the retention of fish caught by an angler.

(b) to provide such a device that will encompass a gamut of sport fishing situations.

(c) to provide such a device that is readily accessed and secured again after each use.

It is also an object of the present invention to provide such a device which is of simple, inexpensive construction.

Another object is to provide such a device in a compact, lightweight form that can be easily stored, such as in a tacklebox or fishing vest.

Still further objects and advantages of the present invention will become apparent from a consideration of the ensuing description and drawings.

The foregoing objects can be accomplished by providing a retaining device featuring a plunger controlled by a spring mechanism contained in a housing. Whereas the plunger and housing each contain a passageway to accept a stringer assembly. In the preferred embodiment of the present invention, the plunger is set into the housing and seated on top of the spring which resides inside the housing. A retaining pin is assembled through the housing and plunger to restrict the travel of said plunger. The base of the housing is threaded to accept various base configurations designed to encompass a variety of sport fishing situations.

Figure 1:
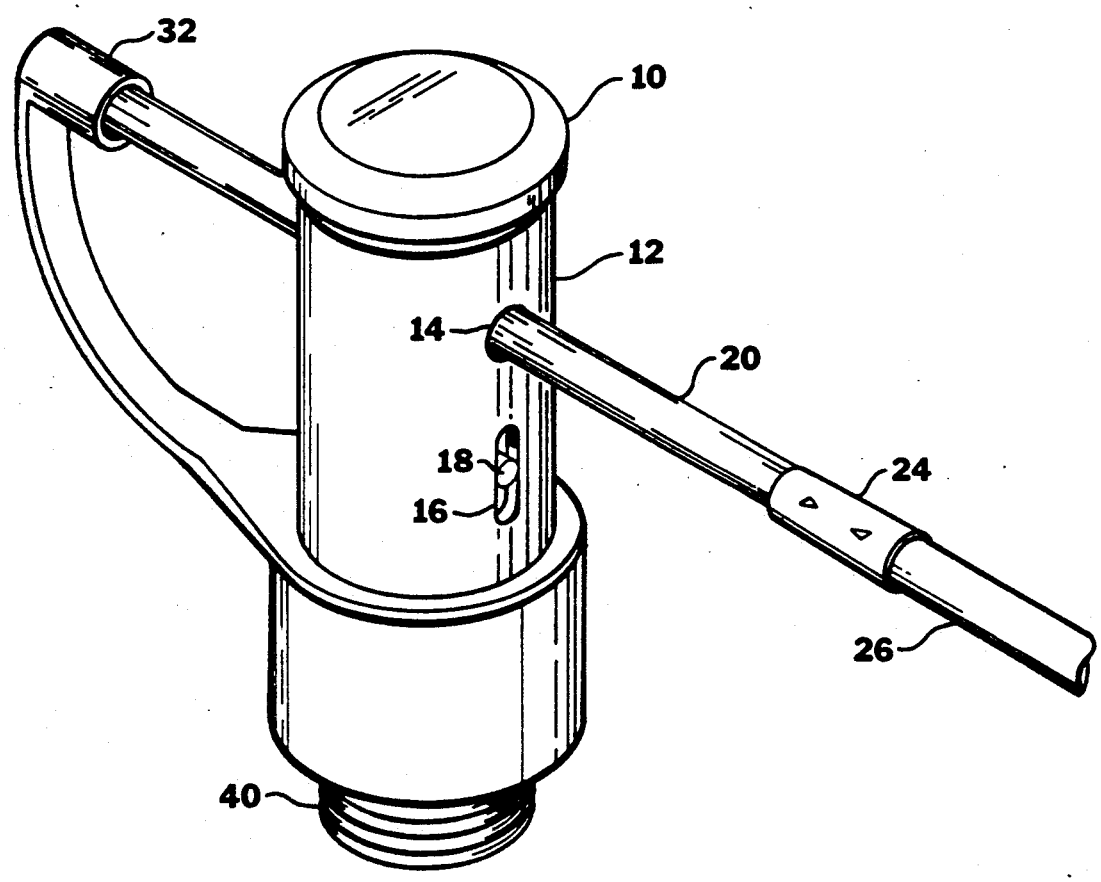
FIG. 1 shows an assembled view of the retaining feature, in accordance with the present invention, with the stringer rod "locked" into position and the stringer rod tip cover attached.

| REFERENCE NUMERALS IN DRAWINGS | |
|---|---|
| 10 plunger | 12 housing |
| 14 stringer rod entry/exit hole | 16 travel pin slot |
| 18 travel pin | 20 stringer rod |
| 22 stringer rod relief | 24 collar |
| 26 stringer line | 28 stop plate |
| 30 end cap | 32 stringer rod tip cover |
| 34 stringer rod through-hole | 36 travel pin through-hole |
| 38 spring | 40 reinforcement plate |
| 42 drain hole | 44 pin |
| 46 retaining through-hole | 48 post |
| 50 base plate | 52 pad |
| 54 threaded rod | 56 locking disk |
| 58 rod spring | 60 rod head |
| 62 bar | |

DETAILED DESCRIPTION

Figure 2:
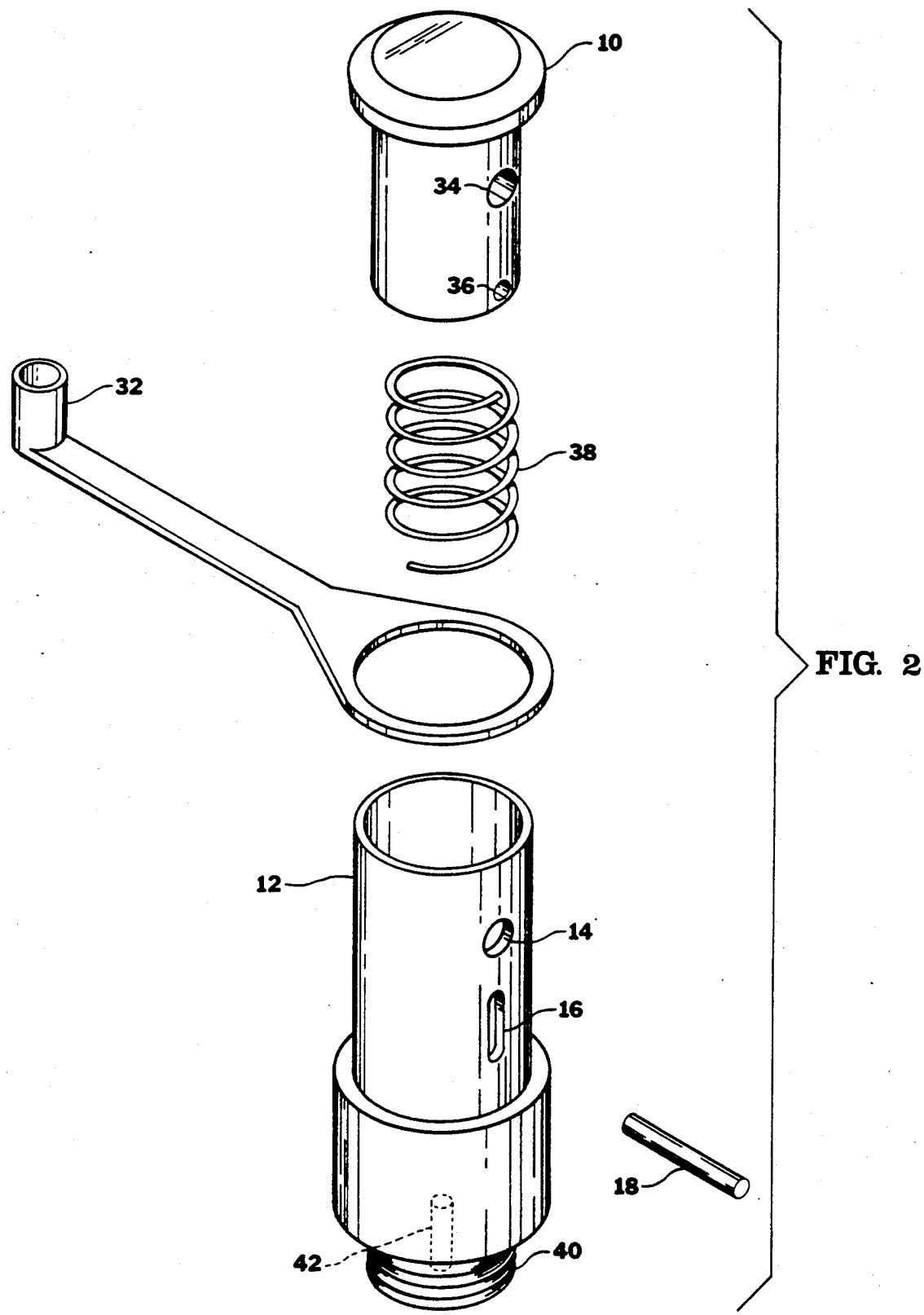
FIG. 2 shows an exploded view of the retaining feature of FIG. 1.

A typical embodiment of the retaining feature of the present invention is illustrated in FIG. 1 (assembled view) and FIG. 2 (exploded view). The retaining feature has a hollow housing 12 with a stringer rod entry/exit hole 14 and a travel pin slot 16 through it. The diameter of hole 14 is greater than the diameter of stringer rod 20. Slot 16 has a width greater than the diameter of travel pin 18 and a length approximately the diameter of hole 14 The lower end portion of housing 12 is flanged to provide a shoulder on which stringer rod tip cover 32 can sit. On the bottom of housing 12 is a reinforcement plate 40 and a drain hole 42. Drain hole 42 passes through housing 12 and reinforcement plate 40 to allow any liquid that gets into housing 12 to escape, e.g., water. In the preferred embodiment of the present invention, reinforcement plate 40 is threaded and is a molded feature of housing 12.

Stringer rod tip cover 32 is a safety feature of the present invention. The end of cover 32 that sits on the lower end portion of housing 12 has a hole with an inside diameter approximately the outside diameter of the upper end portion of housing 12. The opposite end of cover 32 has a cylindrical cap with an inside diameter approximately the diameter of stringer rod 20 and a depth roughly twice the length of the beveled rod tip. The two ends of cover 32 are connected by an arm that provides enough length from the edge of housing 12 to allow the cap at the opposite end to be placed over the beveled tip of stringer rod 20 when the rod is engaged in the retaining feature. In the preferred embodiment, cover 32 consists of a flexible material such as rubber or vinyl.

Spring 38 fits inside housing 12 to provide the tension for plunger 10 to retain stringer rod 20. The height of spring 38 must allow it to be slightly compressed when plunger 10 is assembled. In the preferred embodiment, spring 38 consists of a non-corrosive material, such as stainless spring steel or spring steel dip coated in a plastic dispersion.

Plunger 10 sits on top of spring 38 inside housing 12 Plunger 10 is cylindrical in shape consisting of a solid material with a stringer rod through-hole 34 and a travel pin through-hole 36. Through-hole 34 is for receiving and locking stringer rod 20 in place and has a diameter equal to that of hole 14 in housing 12. Through-hole 36 secures travel pin 18. The diameter of through-hole 36 is slightly smaller than the diameter of travel pin 18 to provide an interference fit between the two. This will prevent travel pin 18 from moving or falling out once assembled.

Figure 3:
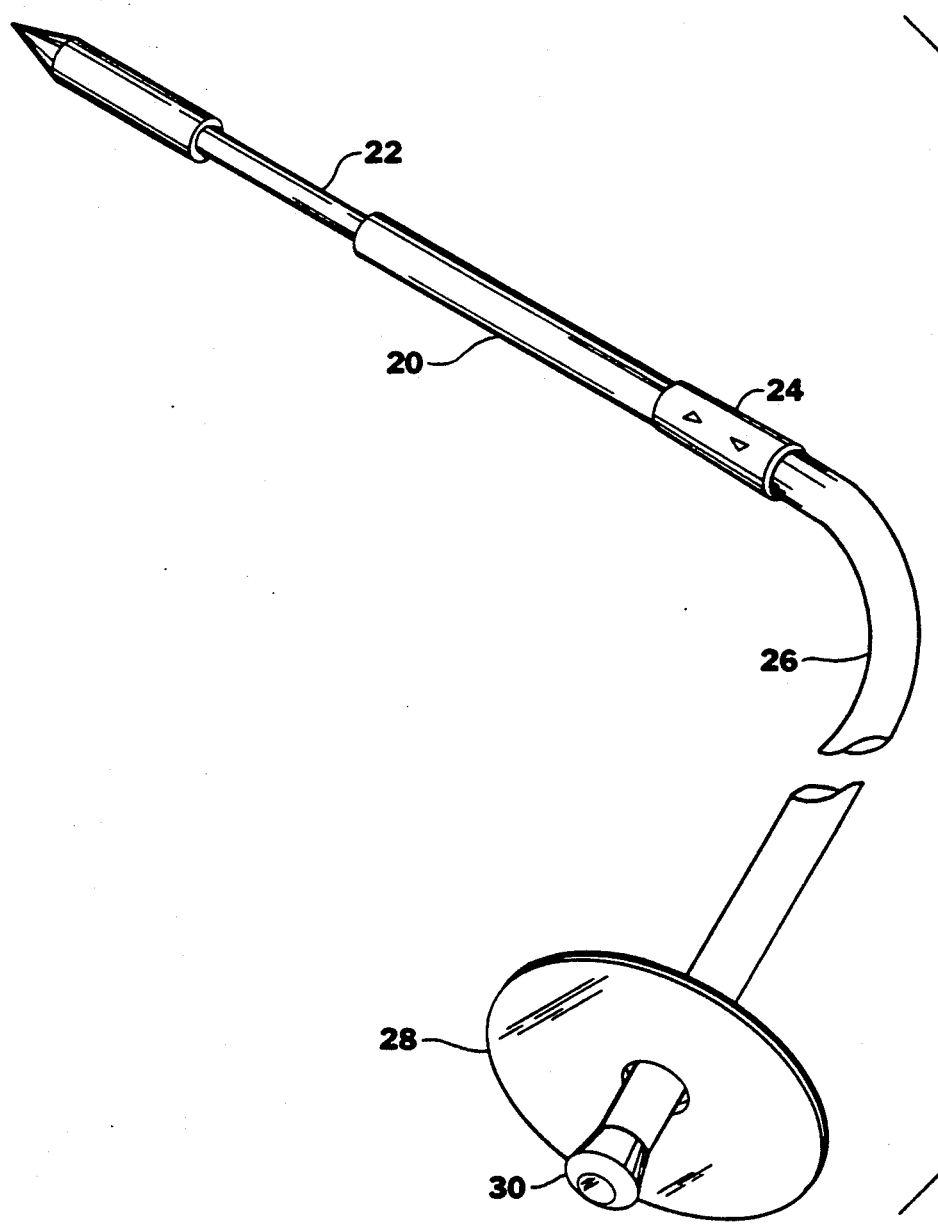
FIG. 3 shows the stringer assembly of FIG. 1.

The top of plunger 10 has a plate with an outside diameter greater than the outside diameter of the upper end portion of housing 12. The main body of plunger 10 has an outside diameter slightly smaller than the inside diameter of housing 12 to allow for ease of movement. The lower end portion of plunger 10 is beveled to allow for better stability when seated on spring 38 When plunger 10 is assembled into housing 12, the top plate should sit flush on housing 12 and through-holes 34 and 36 should be aligned with hole 14 and the bottom of slot 16 respectively. The length of plunger 10 should be no longer than the space between the top of spring 38 when fully compressed to the top of housing Travel pin 18 secures plunger 10 and spring 38 in housing 12. Pin 18 is assembled through slot 16 in housing 12 and through-hole 36 in plunger 10. The length of travel pin 18 is equal to the outside diameter of the upper end portion of housing FIG. 3 illustrates the preferred embodiment of the stringer rod assembly of the present invention. Stringer rod 20 is cylindrical in shape consisting of a solid material. The length of stringer rod 20 is roughly three to four times the outside diameter of housing 12. The tip of stringer rod 20 is beveled.

Stringer rod relief 22 provides the means for plunger 10 to engage and hold stringer rod 20 in place. Relief 22 is located a distance from the beveled tip of stringer rod 20 such that when stringer rod 20 is engaged in the retaining feature, the beveled tip of stringer rod 20 protrudes a distance roughly three times the length of the beveled rod tip. Relief 22 has a length approximately the outside diameter of plunger 10 and enough depth to provide sufficient interference by plunger 10 The edges of relief 22 are typically 90 degrees from top to bottom to allow for plunger 10 to fully engage.

Stringer rod 20 is assembled to a stringer line 26 by a collar 24. In the preferred embodiment, collar 24 is crimped to stringer line 26.

Stringer line 26 may be any suitable length and consist of a suitable material, such as cotton, synthetic, or steel cord. A stop plate 28 is secured on the tail end of stringer line 26 by an end cap 30.

Stop plate 28 and end cap 30 provide a point of termination at the end of stringer line 26. The diameter of stop plate 28 is roughly three to four times the diameter of the lower end portion of housing 12. The diameter of the through-hole in stop plate 28 is slightly larger than the diameter of stringer line 26.

End cap 30 has a hole on one end greater than the diameter of stringer line 26. The body of end cap 30 is greater than the diameter of the through-hole in stop plate 28. In the preferred embodiment, end cap 30 is crimped on the end of stringer line 26

FIGS. 4, 5, 6, and 7 illustrate the preferred embodiments of the base assembly for the retaining feature. In each case, the base assembly is a unique appendage that can be attached to the lower end portion of housing 12.

Figure 4:
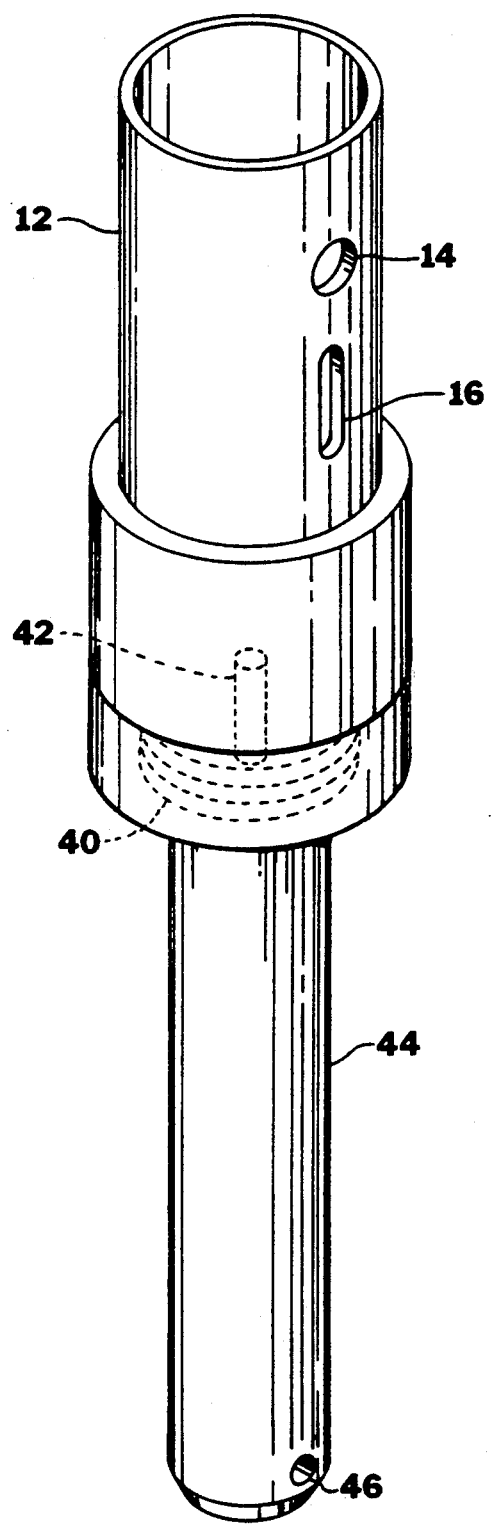
FIG. 4 shows the base assembly, attached to the housing, used in an oar lock or appropriate cylindrical mount.

In FIG. 4, a pin 44 is attached to reinforcement plate 40 by a threaded cup. The cup has an inside diameter equal to the diameter of reinforcement plate 40 and a depth equal to the length of reinforcement plate 40. Both reinforcement plate 40 and the inside diameter of the cup have the same type and size threads Pin 44 has a diameter less than the inside diameter of a typical watercraft oar pin lock and a length greater than the oar pin lock. The lower end of pin 44 has a retaining through-hole 46 used to secure the base assembly in a typical cylindrical mount. The diameter of through-hole 46 should be greater than the diameter of the pin or clip chosen to be used as the retaining device.

Figure 5:
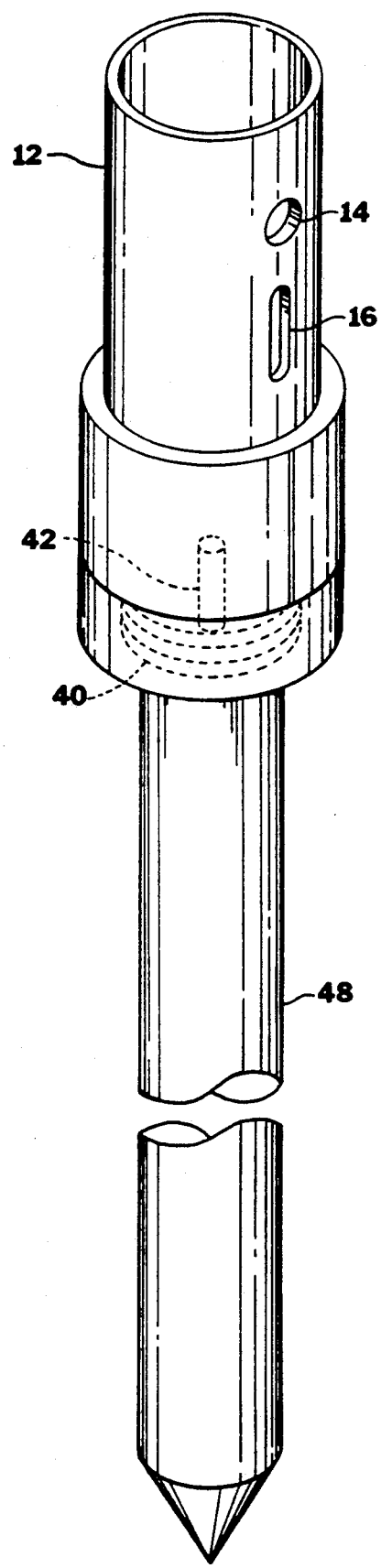
FIG. 5 shows the base assembly, attached to the housing, used by lodging it in the ground.

In FIG. 5, a post 48 with a beveled tip is attached to reinforcement plate 40 by a threaded cup. The cup has an inside diameter equal to the diameter of reinforcement plate 40 and a depth equal to the length of reinforcement plate 40. Both reinforcement plate 40 and the inside diameter of the cup have the same type and size threads. Post 48 allows the base assembly to be planted securely in the ground. The diameter and the length of post 48 should be dimensioned accordingly.

Figure 6:
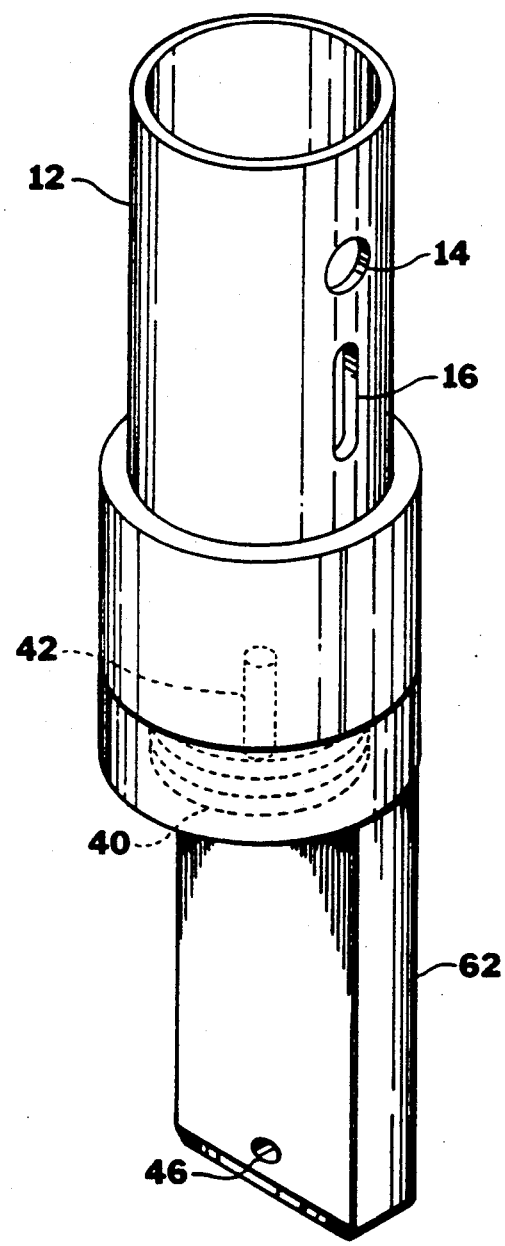
FIG. 6 shows the base assembly, attached to the housing, used to clip on to an appropriate keeper.

In FIG. 6, a bar 62 is attached to reinforcement plate 40 by a threaded cup. The cup has an inside diameter equal to the diameter of reinforcement plate 40 and a depth equal to the length of reinforcement plate 40. Both reinforcement plate 40 and the inside diameter of the cup have the same type and size threads. The length of bar 62 is approximately two thirds the length of housing 12 and the width approximately one third the outside diameter of housing 12. The lower end of bar 62 has a retaining through-hole 46 used to secure the base assembly to an object or person. The diameter of through-hole 46 should be greater than the diameter of the clip, pin, or ring chosen to be used as the retaining device.

Figure 7:
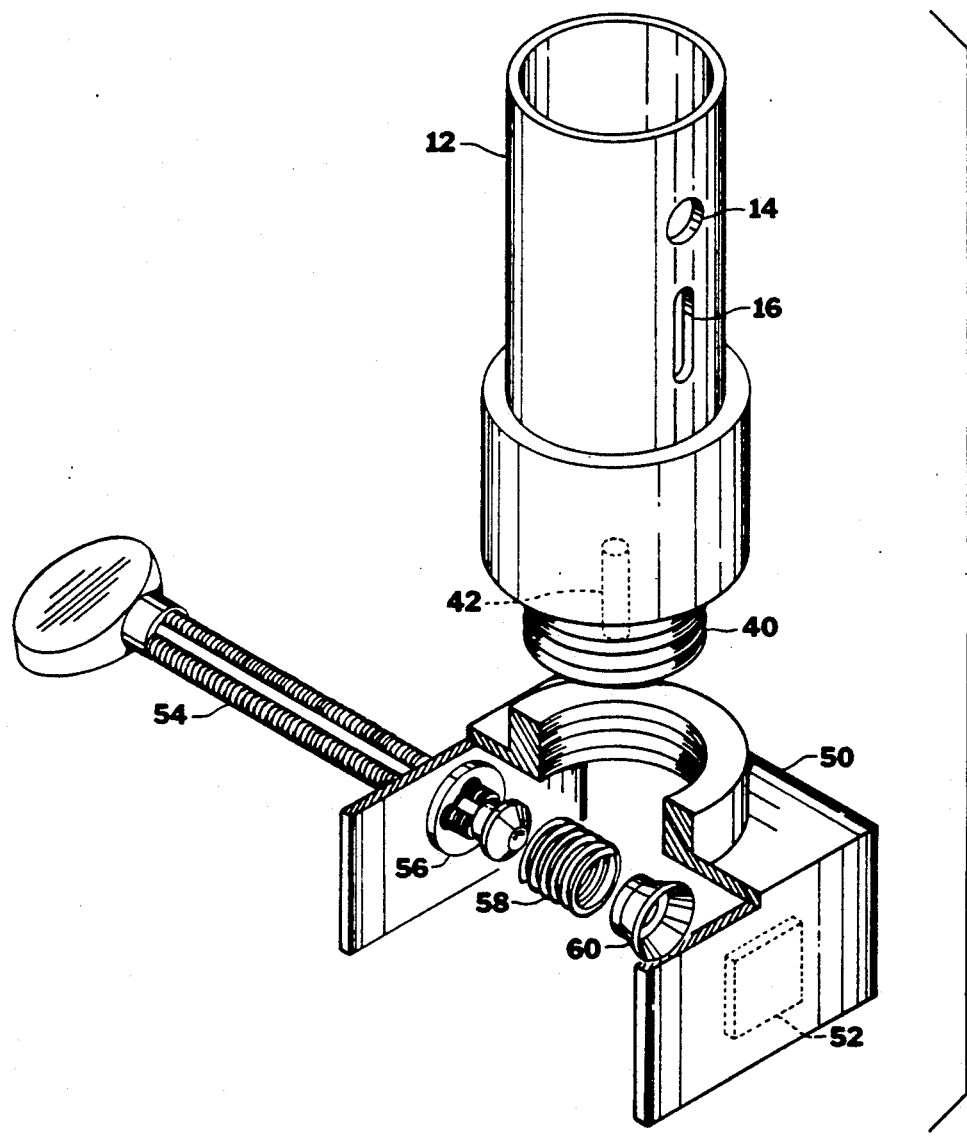
FIG. 7 shows an exploded view of the base assembly and the housing for use on the gunnel of a watercraft.

In FIG. 7, reinforcement plate 40 is fastened into a threaded cylindrical extension on base plate 50.

Base plate 50 is formed with a 90 degree extension plate on either end to allow it to be placed over, and secured to, an object, e.g., the gunnel of a watercraft. The cylindrical extension on the top of base plate 50 has an inside diameter equal to the diameter of reinforcement plate 40 and a height equal to the length of reinforcement plate 40. Both reinforcement plate 40 and the inside diameter of the cylindrical extension on base plate 50 have the same type and size threads. The length of base plate 50 should be greater than the width of a typical gunnel on a watercraft. The width of base plate 50 should be greater than the outside diameter of the lower end portion of housing 12.

A threaded rod 54 is assembled from the outside of base plate 50 through a hole in one of the end extension plates. Rod 54 is cylindrical in shape with threaded protrusions extending down the length of it. The end of rod 54 assembled through base plate 50 has a ball-type joint. The opposite end of rod 54 has a thumb plate to aid in moving and fastening it in base plate 50. The length of rod 54 should be greater than the length of base plate 50.

Attached to the inside of the same end extension plate that rod 54 fits through is a locking disk 56. Disk 56 allows rod 54 to transfer axial motion to radial motion when securing the base plate assembly to an object. The inside diameter of disk 56 is equal to the outside diameter of the threaded protrusions on rod 54. The inside diameter of disk 56 is threaded and notched according to the number of threaded protrusions on rod 54. Each notch is placed at a distance from the other equal to the distance of each threaded protrusion on rod 54. The radius of each notch in disk 56 is greater than the radius of each threaded protrusion on rod 54 and has a smooth interior. In the preferred embodiment of the present invention, disk 56 is a molded feature of base plate 50.

A rod spring 58 fits over rod 54 to provide a forward force on rod 54. The inside diameter of spring 58 is greater than the diameter of the threaded protrusions on rod 54. Spring 58 is a long coil spring and has a length from end to end approximately the length of base plate 50.

A rod head 60 fits over the end of rod 54 to provide a base to distribute the force of rod 54 when it is engaged. Rod head 60 has a socket in the end in which the ball-type joint on the end of rod 54 is secured. A lip inside the socket end of rod head 60 holds spring 58 in place. The opposite end of rod head 60 is flared.

A pad 52 is attached to base plate 50 opposite the plunger assembly. Pad 52 provides an area to accept the force offered by rod head 60. Pad 52 will also aid in securing base plate 50 to an object while protecting that object from marring which may be caused by base plate 50.

From the description above, a number of advantages of my mechanically retained fish stringer assembly become evident:

(a) The use of a spring-loaded retaining device will provide a convenient and effective means of securing at least a stringer assembly.

(b) By creating a variety of unique appliances that can be attached to the lower end portion of the housing of the retaining feature, the stringer assembly will encompass a gamut of sport fishing situations.

(c) The presence of a relief in the stringer rod, along with the quick "push button" ease of activating the retaining feature, provides a device that can be readily accessed and secured again after each use.

The mechanics of my fish stringer assembly are simple and inexpensive to produce, and provide a compact, lightweight package that can be easily stored.

OPERATION OF THE INVENTION

Operation of the retaining feature for the fish stringer assembly is as follows:

The cap on the end of stringer rod tip cover 32 is removed from the beveled rod tip of stringer rod 20 by using a mild pulling force away from the axial position of stringer rod 20 Because cover 32 is secured to housing 12 by the looped end opposite the cap, the cap can be "dropped" along side housing 12 without being lost.

A downward pressure is applied to plunger 10 to reverse the upward force being applied to stringer rod 20 through the semi-compressed action of spring 38. Travel pin 18 determines the distance plunger 10 can travel. When pin 18 reaches the bottom of travel pin slot 16 in housing 12, stringer rod through-hole 34 in plunger 10 and stringer rod entry/exit hole 14 in housing 12 are aligned and stringer rod 20 can be removed.

Stringer rod 20 is removed from plunger 10 and housing 12 using a mild pulling force away from plunger 10 and housing 12 After stringer rod 20 is removed, the downward pressure being applied to plunger 10 can be discontinued. This will allow plunger 10 to "spring" up. When pin 18 reaches the top of slot 16 in housing 12, plunger 10 is in resting position.

To secure a fish, stringer rod 20 is inserted and drawn out of the fish in such a way as to prevent the fish from escaping Stringer rod 20 is pulled in a direction away from the fish to draw stringer line 26 through the same entry and exit hole created by stringer rod 20. Line 26 is pulled through the fish until stop plate 28 is flush against the fish. Subsequent fish will be placed against one another.

To reinsert stringer rod 20 back into the retaining feature, plunger 10 is depressed until pin 18 reaches the bottom of slot 16 in housing 12. Through-hole 34 and entry/exit hole 14 will then be aligned to accept stringer rod 20. Stringer rod 20 is inserted into entry/exit hole 14 in housing 12 and through-hole 34 in plunger 10. At this point, the downward pressure on plunger 10 is discontinued and stringer rod 20 is inserted further with a light pushing force until a "click" is heard or felt. This "click" will indicate that plunger 10 has engaged stringer rod relief 22 and stringer rod 20 is secured in place.

The cap on the end of stringer rod tip cover 32 is placed over the beveled tip of stringer rod 20 using a mild pushing force to secure it in place. The cap will decrease the possibility of injury that may be caused by the rod tip.

The various base configurations of the retaining feature of the fish stringer assembly are used as follows:

Pin 44 is placed in a typical cylindrical mount, e.g., an oar pin lock, and secured by a retaining pin or clip assembled in through-hole 46.

Post 48 is planted securely into the ground by a downward bodily force.

Bar 62 is attached to an object or person by a pin, clip, or ring assembled in through-hole 46.

Base plate 50 is assembled to an object as follows:

The rod assembly for base plate 50 is loosened by turning threaded rod 54 by its thumb plate in a counter-clockwise direction until the threaded protrusions are aligned with the notches in locking disk 56. Rod 54 is then free to move in or out of base plate 50.

Rod 54 is drawn back from base plate 50 to open up an area between rod head 60 and pad 52. Base plate 50 is then placed over an object, e.g., the gunnel of a watercraft. To tighten and secure the plunger assembly, rod 54 is released to allow it to "spring" forward until rod head 60 comes to rest on the object base plate 50 is being secured to. This action will also draw pad 52 up against the object to provide an area to accept the force offered by rod head 60 while also protecting the object from marring which may be caused by base plate 50. Rod 54 is then pushed forward, to assure a flush fit is taking place between rod head 60 and the object, and turned in a clockwise direction to "lock" into locking disk 56. The "locking" between rod 54 and locking disk 56 takes place when the threaded protrusions on rod 54 mesh with the threaded areas in locking disk 56. This also causes the rod assembly to be drawn tighter against the object.

SUMMARY, RAMIFICATIONS, AND SCOPE OF THE INVENTION

Accordingly, the reader will see that the mechanically retained fish stringer assembly of this invention provides a highly reliable, lightweight, yet economical device which can be used by persons of almost any age. Furthermore, the mechanical fish stringer assembly has the additional advantages in that it provides a convenient and effective means of securing at least a stringer assembly to a location for the retention of fish caught by an angler;

it encompasses a variety of sport fishing situations;

it provides a device that is readily accessed and secured again after each use.

Although the description above contains many specificities, these should not be construed as limiting the scope of the invention but as merely providing illustrations of some of the presently preferred embodiments of this invention. For example, the retaining feature can have other shapes, such as oval, square, triangular, etc.; the various base configurations can have other shapes or means of securing them to an object, etc.

Thus the scope of the invention should be determined by the appended claims and their legal equivalents, rather than by the examples given.

I claim:

1. An apparatus for retaining fish comprising:
   a plunger slidably mounted within a housing;
   an elastic device biasing said plunger from a first position to a second position in said housing;
   said housing having a hollow opening at one end and a stable base at its opposite end;
   said plunger and housing having holes extending therethrough wherein said holes are aligned when said plunger is in said second position to define an opening extending through said housing and said plunger; said housing further including a longitudinal slot;
   a pin that intersects said plunger and said slot thereby retaining said plunger and said elastic device in said housing;
   an attachment means for attaching the apparatus to a point of use;
   means for mounting said attachment to means said housing base;
   a stringer comprising a flexible member having at one end and a stop means at the other end, whereby said stringer is inserted through a fish retained thereon.

2. A retaining apparatus as defined in claim 1 wherein said elastic device is composed of a non-corrosive material.

3. A retaining apparatus as defined in claim 1 wherein said mounting means are threads which communicate with threads on the attachment means.

4. A retaining apparatus as defined in claim 1 wherein, said housing base has a hole for draining liquid from the housing.

5. A retaining apparatus as defined in claim 1 wherein, said attachment means is a pin which, when mounted on said housing base, adapts the apparatus for use in a hollow support means.

6. A retaining apparatus as defined in claim 5 wherein, said attachment means is a post which, when mounted on said housing base, adapts the apparatus for lodging in the ground.

7. A retaining apparatus as defined in claim 1 wherein, said attachments means is a bar which, when mounted on said housing base, adapts the apparatus for attachment to an object or person.

8. A retaining apparatus as defined in claim 1 wherein, said attachments is a bracket which, when mounted on said housing base, adapts the apparatus for use on a dimensional structure.

9. A retaining apparatus as defined in claim 2 wherein:
   said bracket has a generally planar cross-section, and two flattened protrusions extending from the opposite ends thereof for embracing said dimensional structure.

10. A retaining apparatus as defined in claim 9 wherein:
    one said flattened protrusion contains a hole,
    said hole being threaded and notched at regular intervals.

11. A retaining apparatus as defined in claim 1 wherein:
    a threaded rod intersects said hole,
    said rod having a length greater than the distance between said flatten protrusions,
    a spring means biases the rod toward the other of said flattened protrusions,
    said rod having a thumb plate at its outer extremity relative to said protrusions, and
    a flattened head at its inner extremity relative to said protrusions, wherein said dimensional structure is located between the other of said flattened protrusions and said flattened head when said apparatus is attached to said structure.

* * * * *

UNITED STATES PATENT AND TRADEMARK OFFICE
CERTIFICATE OF CORRECTION

PATENT NO. : 5,078,310
DATED : January 7, 1992
INVENTOR(S) : DeLois M. Ferry

It is certified that error appears in the above-identified patent and that said Letters Patent is hereby corrected as shown below:

Col. 3, line 22, after "housing" insert --12.--;

Col. 3, line 27, after "housing" insert --12.--;

Col. 7, line 33, change "to means" to --means to--;

Col. 7, line 35, after "having" insert --a rod--;

Col. 8, line 8, change '5' to --1--;

Col. 8, line 17, change "attachments" to --attachment means--;

Col. 8, line 20, change '2' to --8--;

Col. 8, line 31, change '1' to --10--;

Column 8, line 34, before "said" insert --said rod being grooved at regualr intervals,--.

Signed and Sealed this

Seventeenth Day of November, 1992

Attest:

DOUGLAS B. COMER

Attesting Officer

Acting Commissioner of Patents and Trademarks